(12) United States Patent
Collins

(10) Patent No.: US 6,547,042 B1
(45) Date of Patent: Apr. 15, 2003

(54) GAP SCANNING

(75) Inventor: Peter Collins, Oxon (GB)

(73) Assignee: Airdri Limited, Witney Oxon (GB)

( * ) Notice: Subject to any disclaimer, the term of this patent is extended or adjusted under 35 U.S.C. 154(b) by 0 days.

(21) Appl. No.: 10/049,983

(22) PCT Filed: Aug. 23, 2000

(86) PCT No.: PCT/GB00/03251
§ 371 (c)(1),
(2), (4) Date: Mar. 12, 2002

(87) PCT Pub. No.: WO01/14677
PCT Pub. Date: Mar. 1, 2001

(30) Foreign Application Priority Data

Aug. 23, 2000 (GB) .............................. 9919862

(51) Int. Cl.$^7$ .............................................. B66B 13/26
(52) U.S. Cl. ........................................... 187/317; 49/26
(58) Field of Search ................................. 187/316, 317; 49/26, 28; 250/341.1, 341.7, 345, 348, 553, 559.12, 221, 223 R

(56) References Cited

U.S. PATENT DOCUMENTS

| | | | |
|---|---|---|---|
| RE33,668 E | * 8/1991 | Gray | 250/221 |
| 5,130,532 A | 7/1992 | Clemens | 250/221 |
| 5,149,921 A | * 9/1992 | Picado | 187/317 |
| 5,420,430 A | * 5/1995 | Trett | 250/341.1 |
| 5,583,334 A | * 12/1996 | Baumann | 250/221 |
| 5,925,858 A | * 7/1999 | Full et al. | 187/317 |
| 6,167,991 B1 | * 1/2001 | Full et al. | 187/317 |
| 2001/0045328 A1 | * 11/2001 | Pustelniak et al. | 187/317 |

FOREIGN PATENT DOCUMENTS

| | | |
|---|---|---|
| DE | 29901664 | 4/1999 |
| EP | 0699619 | 3/1996 |
| EP | 0709336 | 5/1996 |

* cited by examiner

*Primary Examiner*—Jonathan Salata
(74) *Attorney, Agent, or Firm*—Davis & Bujold, P.L.L.C.

(57) ABSTRACT

A method of gap scanning wherein a first working member (such as a door) in conjunction with a second working member (such as a door) in conjunction with a second working member (such as another door, a door frame or a fixed surface) serves to define or include the gap to be scanned; the method comprising the steps of: locating on or near the other side of the gap an array of emitters of electromagnetic radiation; location on the other side of the gap an array of receivers of the electromagnetic radiation; each emitter in the array thereof being adapted to provide for the emission of a beam of radiation along an axis of transmission from the emitter across the gap to one or more of the receivers in the array thereof; each receiver in the array thereof being adapted to detect a beam of radiation from one or more of emitters in the array thereof along an axis of reception to the receiver across the gap from the emitters; providing an output channel for each receiver in the array thereof by way of which in the event detects a beam of radiation as aforesaid the receiver emits an output signal; linking a group of at least two receivers by way of their output channels by way of a common line to a switch such that on the switch receiving an output signal along the common line from the group it is unable to discriminate as to which of the receiver or receivers in the group generated or contributed to the output signal.

16 Claims, 4 Drawing Sheets

GAP SCANNING

TECHNICAL FIELD

This invention relates to gap scanning. In particular it is concerned with the scanning of a gap (typically one of variable size) where the occurrence of an intrusion can represent an event which requires a modification of an operation involving the gap.

BACKGROUND ART

An example of a gap scanning requirement arises in connection with a sliding door of an elevator. For safe operation as the door closes the gap being closed by the door is scanned to detect whether something is intruding into the gap. In the event scanning reveals the existence of an intrusion into the gap then operation of the door modified to ensure that the intruding object is not trapped by the closing of the gap. Typically the scanning can be carried out by way of an array of emitters on one side of the gap where each emitter in turn periodically sends out an electromagnetic beam (such as an infra red beam) and a complementary array of receivers on the other side of the gap detect the arrival of the emitted beams. The arrays can be mounted either a fixed distance apart ('a fixed gap') to look across a gap progressively closed by a door or doors. Alternatively one or other of the arrays can be mounted on the leading edge of a door so that arrays are effectively located at or near the lateral boundaries of the gap (a 'variable gap') as it opens or closes.

Another example of gap scanning arises in relation to the safe operation of a machine tool such as a sheet metal press having a working area which is protected by one or more machine guards. Access to the working area by displacement of one or more guards serves to leave a gap. This may be necessary for a number of reasons typically to enable material to be fed to or removed from the working area or for cleaning of or adjustments to be made. For as long as the gap is being scanned and an intrusion in the gap is detected such as the arm of an operator then operation of the tool is inhibited until the intrusion is removed.

In what follows particular reference is made to use of the invention in relation to an elevator. However the invention is not limited to such an application.

In EP 0 699 619 (Memco Limited) there is described a lift installation in which a multi-beam curtain (primary beam) extends across a lift car door opening/Auxiliary transmitters direct secondary beams towards a detection zone in front of the landing doors. The multibeam curtain is intercepted by a passenger entering the lift to prevent premature door closure. However, premature closure is also prevented when a passenger stands in front of the landing doors thereby causing some of the secondary beam to be reflected onto auxiliary receivers. This is said to provide a low cost solution to the problem of non-detection of an obstruction in the closing path of the landing doors, but not intercepting the primary beam system, and also provides an increase in the passenger convenience of the lift, as the doors are held open for a passenger approaching the lift, but not yet interrupting the primary beams.

In EP 0 709 336 (Otis Elevator Company) there is described an apparatus for detecting weak beams in a beam detecting system including a plurality of emitters for radiating beams of energy, a plurality of detectors for providing detector signals in response to the beams of energy radiated by said plurality of emitters and means for detecting if the beams radiated by said plurality of emitters are weak. If weak beam is detected the beam is determined inoperative by the obstruction detection system and is not considered in subsequent obstruction detection.

DISCLOSURE OF INVENTION

According to a first aspect of the present invention A method of gap scanning wherein a first working member (such as a door) in conjunction with a second working member (such as another door, a door frame or a fixed surface) serves to define or include the gap to be scanned; the method including the steps of: locating on one side of the gap an array of emitters of electromagnetic radiation; locating on the other side of the gap to the one side an array of receivers of the electromagnetic radiation; each emitter in the array thereof being adapted to provide for the emission of a beam of radiation along an axis of transmission from the emitter across the gap to one or more of the receivers in the array thereof; each receiver in the array thereof being adapted to detect a beam of radiation from one or more of emitters in the array thereof along an axis of reception to the receiver across the gap from the emitters; providing an output channel for each receiver in the array thereof by means of which in the event the receiver detects a beam of radiation as aforesaid the receiver emits an output signal; characterised by the steps of:

1 linking a group of at least two receivers (10) by way of the their output channels by means of a common line (X1–X8) to a switch (M1–M3) such that on the switch receiving an output signal along the common line (X1–X8) from the group it is unable on the basis of that output signal alone to discriminate as to which of the receiver or receivers in the group generated or contributed to the output signal;

2 causing the switch on receiving an output signal as aforesaid to transmit to a processor a second signal;

3 enabling the processor to identify the member or members of the group causing the generation of the second signal by virtue of the time of arrival of the second signal relative to some time datum and/or to the location of the group relative to some geometric datum; and 4 comparing the second signal or a function thereof with a predetermined value in order to establish whether the second signal represents:

a first state of the gap such as could arise from an obstruction resulting in radiation emitted from one or more emitter being prevented by the obstruction from falling on one or more members of the group; or a second state such as could arise from an anomalous condition, and in the event the second signal represents the first state then initiating a control change to occur to cause, in the case of a variable size gap, a change in the spatial relationship between the first and the second working members from that existing prior to the comparing step (such as by causing the gap to stop changing or to cause it to increase) or, in the case of a fixed size gap, modifying some pre-existing control condition dependent on whether or not the first state exists.

According to a first preferred version of the first aspect of the present invention the array of receivers comprises N receivers and these are separated into A groups of receivers where A<N and A common lines are provided to link the groups to the switch.

According to a second preferred version of the first aspect of the present invention or of the first preferred version thereof the gap is of fixed size.

According to a third preferred version of the first aspect of the present invention or of the first preferred version thereof the first and second working members are movable relative to one another so that the gap is variable in size between a maximum size, when the first and second members are in an open position, and a minimum size when the first and second working members are in a closed position. Typically at least one array is located at or near and for movement with, a leading edge of the first or the second working member.

According to a fourth preferred version of the first aspect of the present invention or any preceding preferred version thereof the axis of transmission and the axis of reception are off-set from one another so that, at least with the gap at or near its maximum value no given axis of transmission is coaxial with a given axis of reception.

According to a fifth preferred version of the first aspect of the present invention or any preceding preferred version thereof at least the majority of axis of transmission are parallel to the majority of the axis of reception.

According to a second aspect of the present invention there is provided apparatus for scanning a gap defined between first and second working members having a first linear array of emitters of electromagnetic radiation mounted at a first datum position relating to one of the working members; a second linear array of receivers of the electromagnetic radiation mounted at a second datum position relating to the other one of the working members; each emitter in the array thereof being adapted to provide for the emission of a beam of radiation along an axis of transmission from the emitter across the gap to one or more of the receivers in the array thereof; each receiver in the array thereof being adapted to detect a beam of radiation from one or more of emitters in the array thereof along an axis of reception to the receiver across the gap from the emitters; characterised in that 1 the receivers in the second linear array each having a receiver output channel by means of which the receiver emits an output signal in the event of detecting a beam of radiation as aforesaid; the receivers being linked in groups by way of their output channels to a common line;

2 a switch linked to the common line of each group; the switch being adapted for switching in turn between the common channels so that when the switch is coupled to a common line and receives an output signal along that common line then regardless of the particular receiver member or members of the group that caused the output signal the switch transmit to a processor a second signal;

3 the processor being adapted to identify the member of a given group causing the generation of the second signal by some other criteria such as the time of arrival of the second signal relative to some time datum or to the location of the group relative to some geometric datum;

4 comparator means whereby the second signal or a function thereof is compared with a predetermined value in order to establish whether the second signal represents: a first state of the gap such as could arise from an obstruction resulting in radiation emitted from one or more emitter being prevented by the obstruction from falling on one or more members of the group; or a second state such as could arise from an anomalous condition, and 5 control means operable so that in the event the second signal represents the first state of the gap a control step is initiated to ameliorate the effect of the intrusion.

According to a first preferred version of the second aspect of the present invention there is provided apparatus for scanning a gap characterised in that the array of receivers comprises N receivers and these are separated into A groups of receivers where A<N with the consequent provision of A common lines linking the groups to the first processor.

According to a second preferred version of the second aspect of the present invention or of the first preferred version thereof the gap is of fixed size.

According to a third preferred version of the second aspect of the present invention or of the first preferred version thereof the first and second working members are movable relative to one another so that the gap is variable in size between a maximum size, when the first and second members are in an open position, and a minimum size when the first and second working members are in a closed position. Typically at least one array is located at or near, and for movement with, a leading edge of the first or the second working member.

According to a fourth preferred version of the present invention or of any preceding preferred version thereof the axis of transmission for the emitters in the array thereof and the axis of reception for the receivers in the array thereof are off-set from one another so that, at least with the gap at or near its maximum value, no given axis of transmission is coaxial with a given axis of reception.

According to a fifth preferred version of the second aspect of the present invention or of any preceding preferred version thereof at least the majority of axis of transmission are parallel to the majority of the axis of reception.

According to a third aspect of the present invention there is provided an elevator having a door gap scanned by the method of the first aspect.

According to a fourth aspect of the present invention there is provided an elevator having a door gap and equipped with an apparatus of the second aspect.

Broadly a gap to be scanned for the presence of an intrusion which lasts for more than a predetermined number of scanning cycles or time can be established in a number of ways.

In a first example the two working members serve to define a gap of fixed width. In this case the scanning operation is concerned with establishing at any given moment whether the (fixed size) gap has an intrusion in it. For this purpose the emitter and receiver arrays can be mounted facing each other on the working members or on something relating to the working members and near to the boundaries of the gap. In a second case the two working members can serve to define a gap of variable width. As before the emitter and receiver arrays are mounted facing each other. However the arrays can be maintained static a fixed distance apart so that they scan a gap which is progressively occupied by a door or doors. Alternatively at least one array can be mounted on a moving working member so that the arrays are moved towards one another move so that the pattern of emitted beams of infra red or other radiation are caused are laterally varied in accordance with the gap.

The present invention is applicable to all such arrangements.

BRIEF DESCRIPTIONS OF DRAWINGS

An exemplary embodiment of the invention will now be described with reference to the accompanying drawings of which:

MODES FOR CARRYING OUT THE INVENTION

Figure 1:
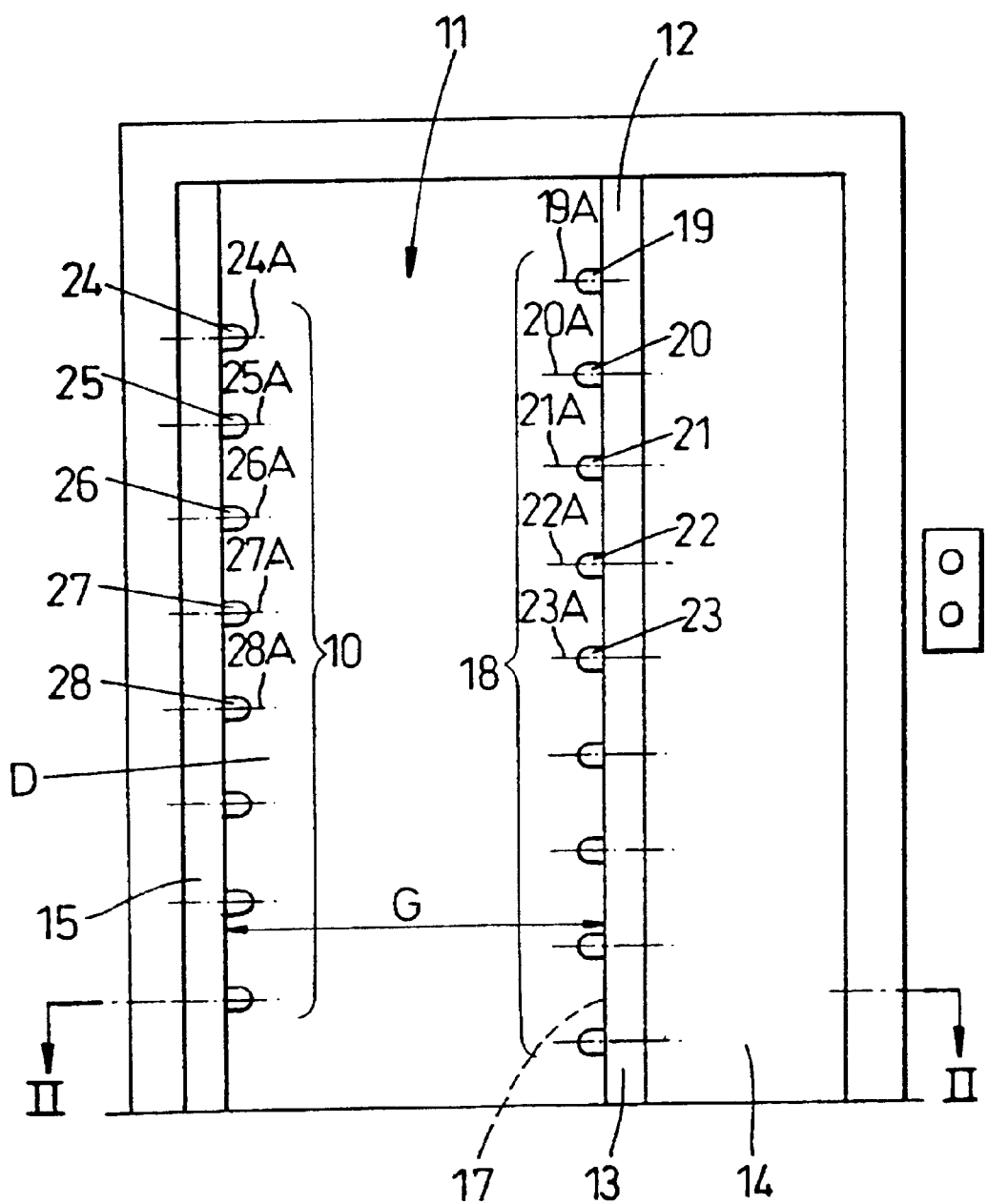
FIG. 1 is a vertical frontal elevation of an elevator stopped at a floor.
Figure 2:
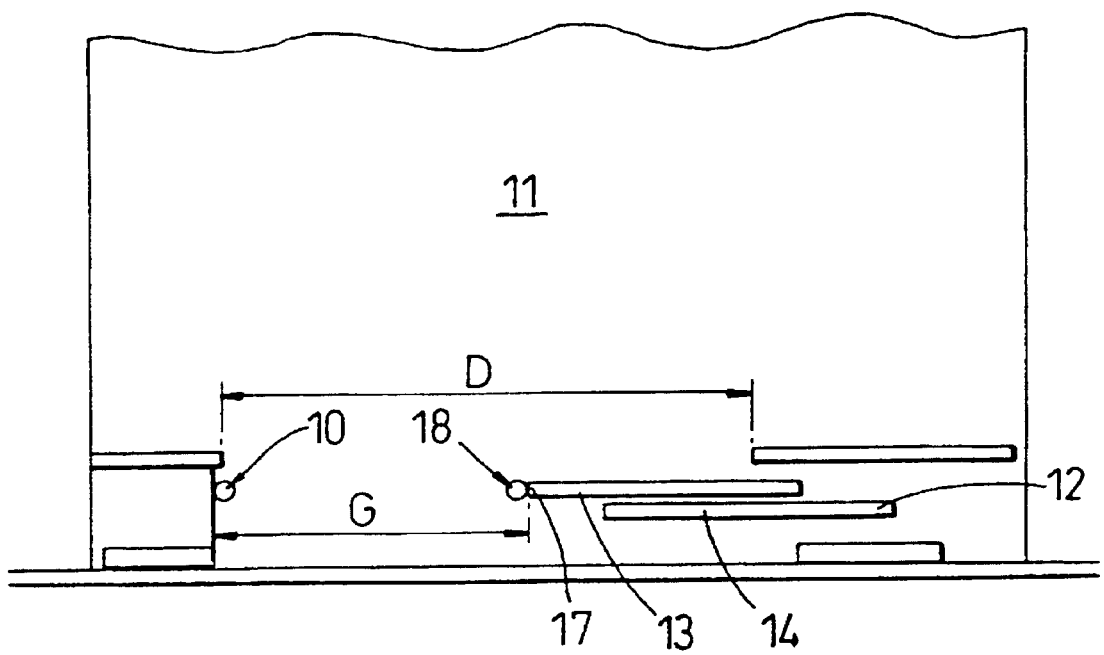
FIG. 2 is a cross section on section II—II of FIG. 1.

FIGS. 1 and 2 variously show an elevator car 11 equipped with first sliding door 12 having two leaves 13, 14. The door is 12 is shown open to give a door opening D enabling users to move freely into and out of the car 11. Between the retracted door 12 and side panel 15 exists a gap G which is scanned periodically as will be described hereafter to establish whether or not an obstruction exists in the gap G which makes it necessary to prevent at least further closure of the gap G if not for re-opening of the door opening.

Leading edge 17 of door 12 is equipped with a first linear array 18 of infra red emitters (typically emitters 19, 20, 21, 22, 23) the individual emitters being located at intervals along the leading edge 17 so as to provide a set of scanning beams extending across the gap G. Each emitter has an individual main optical axis (typically axis 19A, 20A, 21A, 22A, 23A) for, respectively, emitters 19 to 23.

A second linear array 10 of infra red receivers (typically receivers 24, 25, 26, 27) is located on the side panel 15 with individual receivers being located at intervals along the side panel 15. Each receiver has an individual main optical axis (typically axis 24A, 25A, 26A, 27A, for, respectively, emitters 24 to 27).

Figure 3:
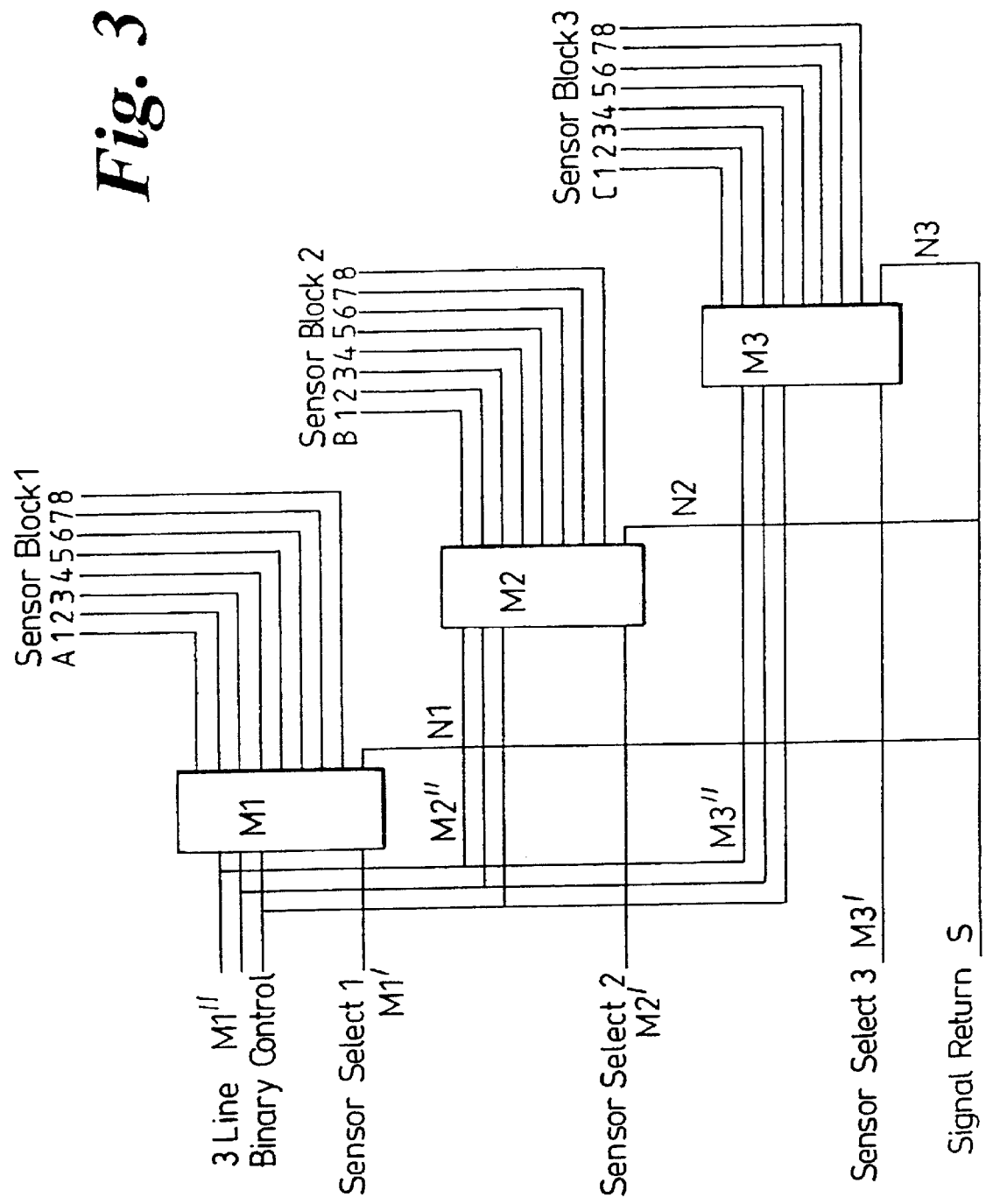
FIG. 3 is a diagram of a conventional circuitry layout for an elevator door gap scanning system.

FIG. 3 shows in part the circuit of a conventional receiver arrangements that could be used for the elevator car 11 to link the receivers to a control system. Twenty four sensors/receivers are grouped into three blocks of eight sensors outputs lines A1–A8, B1 to B8 and C1 to C8. Each block A1–8, B1–8 and C1–8 is coupled, respectively, processor units M1 to M3.

The processor M1 (M2, M3) is operable from a central processor to switch by way of line M1' (M2', M3') to scan a particular output A1–A8 (B1–8, C1–C8). A 3 line binary connection M1" (M2", M3") allows for variation in operation, scan rate or other adjustable variable include in the processor M1 (M2, M3).

The three processor M1, M2, M3 are coupled, respectively by lines N1, N2, N3 to signal return line S.

While the circuitry of FIG. 3 provides a reasonably effective control system for gap scanning there are a large number of components involved and a degree of redundancy which suggests that a more efficient system should be possible with increased reliability.

Figure 4:
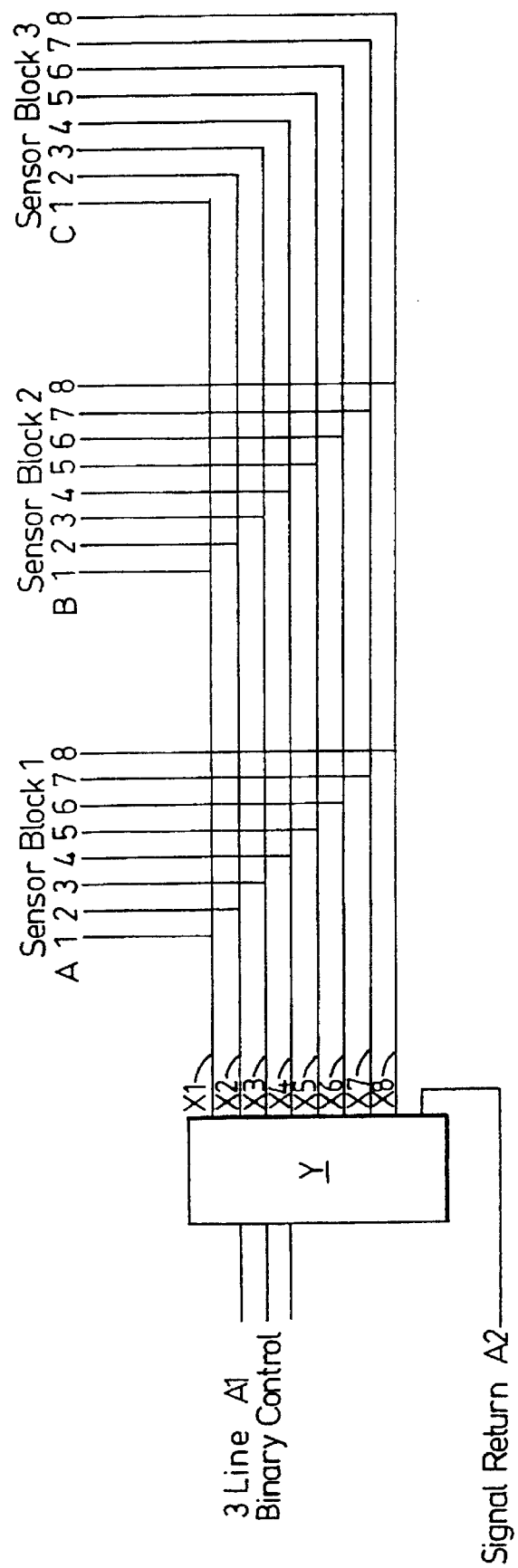
FIG. 4 is a diagram of a circuit showing an embodiment of the present invention when applied to in contrast to the circuit of FIG. 3.

FIG. 4 shows a circuit arrangement embodying the present invention. In this case the number of processors is reduced to one while still covering twenty four sensors/receivers which in this case are grouped into three blocks of eight sensors outputs lines A1–A8, B1 to B8 and C1 to C8. These feed eight common lines X1–8 thus lines A1, B1. C1 are coupled to common line X1; lines A2, B2, C2 coupled to common line X2; and so on. Thus the sensor outputs are gathered into three groups with one common line fed by three lines.

The eight common lines X1–8 feed processor Y which is again scanned by three line binary control 41 with a signal return line 42.

The processor Y enables the output of the sensors A1–8, B1–8, C1–8 to be utilised but by in a multiplexed way so enabling the gap in the elevator door to be scanned without the relative complexity of the circuitry shown in FIG. 3. With the circuitry of FIG. 4 it becomes possible by involving a degree of what can be called fuzzy multiplexing to safely operate the elevator door system but with a system using less components and redundancy than that shown in FIG. 3.

In the context of an elevator door the use of twenty four sensors provides for reasonable discrimination for sensing obstructions in the gap. This was true for the circuitry shown in FIG. 3. However with the circuitry of FIG. 4 in an operating cycle where the emitters on one side of the gap transmit to receivers coupled as shown in FIG. 4 the cyclical response of the receivers to the cyclical output of radiation from the emitters results in an cycle of outputs from the receivers which are fed onto the common lines X1–8. Each common line (typically X1) receive outputs from three sensors (A1, B1, C1) and the processor Y does not discriminate as to which of the three possible sensor outputs a given common line is transmitting. It merely serves to detect that a sensor output signal is received. The processor Y can either incorporate a further processor or transmit to another processor which includes means for identifying the point reached in any given cycle (time function) and is also aware of the disposition of the sensors in space (geometric function). Consequently the combination of the common line involved and of the time and geometric functions enables the detected signals to be evaluated. As a normal operating cycle proceeds the processor system will identify that all received signals correspond to a working norm. However in the event that an obstruction occurs as the gap is reduced then the obstruction will result in one or more receivers not receiving radiation from one or more emitters with a consequent change in cyclical format. The change can represent two states, The first state is an alarm one where an obstruction exists and the cyclic speed of operation should result in a number of non-standard sensor outputs occurring which result in the control system switching to cause the motor driving the moving door member (or in the case of two moving doors members) to be stopped and thereafter reversed to provide for the gap to be increased in size until the doors are fully open.

The second state is an anomalous one (failure of an emitter or receiver, power failure or whatever) which produces a cyclical result which is dearly different from the first state and is probably capable of evaluation so that the control system can effectively, at one extreme, instructs the door operating system to continue to operate the lift in the normal fashion albeit with a slight reduction in functionality at the other extreme to terminate operation of the lift (after completing docking, if necessary at reduced speed and allowing occupants to exit the car) and indicating a non-functioning condition until the functioning of the system is restored to normal.

An anomalous situation could also be taken into account arising from a variation in the infra red radiation arriving at an individual receiver in the second array such as would arise by the arrival of a beam from more than one emitter. This condition can arise in particular when the door is between half and fully open. The effect will be dependent on the polar characteristics of the emitters and the receivers. Again it is envisaged that allowance for this type of anomaly can be programmed into the processor so as to ensure that such a non-critical event will not result in the motor being caused to terminate its closing action so causing a deterioration in the functioning and usage of the lift.

What is claimed is:

1. A method of gap scanning wherein a first working member (such as a door) in conjunction with a second working member (such as another door, a door frame or a fixed surface) serves to define or include the gap to be scanned; the method comprising the steps of: locating on one side of the gap an array of emitters of electromagnetic radiation; location on the other side of the gap to the one side an array of receivers of the electromagnetic radiation; each emitter in the array thereof being adapted to provide for the emission of a beam of radiation along an axis of transmission from the emitter across the gap to one or more of the receivers in the array thereof; each receiver in the array thereof being adapted to detect a beam of radiation from one or more of emitters in the array thereof along an axis of reception to the receiver across the gap from the emitters; providing an output channel for each receiver in the array thereof by way of which in the event the receiver detects a beam of radiation as aforesaid the receiver emits an output signal; characterized by the steps of:

1. linking a group of at least two receivers by way of their output channels by way of a common line to a switch such that on the switch receiving an output signal along the common line from the group it is unable on the basis of that output signal alone to discriminate as to which of the receiver or receivers in the group generated or contributed to the output signal;

2. causing the switch on receiving an output signal as aforesaid to transmit to a processor a second signal;

3. enabling the processor to identify the member or members of the group causing the generation of the second signal by virtue of the time of arrival of the second signal relative to some time datum and/or to the location of the group relative to some geometric datum; and 4. comparing the second signal or a function thereof with a predetermined value in order to establish whether the second signal represents:

a first state of the gap such as could arise from an obstruction resulting in radiation emitted from one or more emitter being prevented by the obstruction from falling on one or more members of the group; or a second state such as could arise from an anomalous condition, and 5. in the event the second signal represents the first state then initiating a control change to occur to cause, in the case of a variable size gap, a change in the spatial relationship between the first and the second working members from that existing prior to the comparing step (such as by causing the gap to stop changing or to cause it to increase) or, in the case of a fixed size gap, modifying some pre-existing control condition dependent on whether or not the first state exists.

2. The method of gap scanning according to claim 1, wherein the array of receivers comprises N receivers and these are separated into A groups of receivers where A<N and A common lines are provided to link the groups to the switch.

3. The method of gap scanning according to claim 1, wherein the gap is of fixed size.

4. The method of gap scanning according to claim 1, wherein the first and second working members are movable relative to one another so that the gap is variable in size between a maximum size, when the first and second members are in an open position, and a minimum size when the first and second working members are in a closed position.

5. The method of gap scanning according to claim 4, wherein at least one array is located at or near and for movement with, a leading edge of the first or the second working member.

6. The method of gap scanning according to claim 1, wherein the axis of transmission and the axis of reception are off-set from one another so that, at least with the gap at or near its maximum value no given axis of transmission is coaxial with a given axis of reception.

7. The method of gap scanning according to claim 1, wherein at least the majority of axis of transmission are parallel to the majority of the axis of reception.

8. Apparatus for scanning a gap defined between first and second working members having a first linear array of emitters of electromagnetic radiation mounted at a first datum position relating to one of the working members; a second linear array of receivers of the electromagnetic radiation mounted at a second datum position relating to the other one of the working members; each emitter in the array thereof being adapted to provide for the emission of a beam of radiation along an axis of transmission from the emitter across the gap to one or more of the receivers in the array thereof; each receiver in the array thereof being adapted to detect a beam of radiation from one or more of emitters in the array thereof along an axis of reception to the receiver across the gap from the emitters;

1. the receivers in the second linear array each having a receiver output channel by means of which the receiver emits an output signal in the event of detecting a beam of radiation as aforesaid; the receivers being linked in groups by way of their output channels to a common line;

2. a switch linked to the common line of each group; the switch being adapted for switching in turn between the common channels so that when the switch is coupled to a common line and receives an output signal along that common line then regardless of the particular receiver member or members of the group that caused the output signal the switch transmit to a processor a second signal;

3. the processor being adapted to identify the member of a given group causing the generation of the second signal by some other criteria such as the time of arrival of the second signal relative to some time datum or to the location of the group relative to some geometric datum;

4. comparator means whereby the second signal or a function thereof is compared with a predetermined value in order to establish whether the second signal represents: a first state of the gap such as could arise from an obstruction resulting in radiation emitted from one or more emitter being prevented by the obstruction from falling on one or more members of the group; or a second state such as could arise from an anomalous condition, and 5. control mechanism operable so that in the event the second signal represents the first state of the gap a control step is initiated to ameliorate the effect of the intrusion.

9. Apparatus for scanning a gap according to claim 8, wherein the array of receivers comprises N receivers and these are separated into A groups of receivers where A<N with the consequent provision of A common lines linking the groups to the first processor.

10. Apparatus according to claim 8, wherein the gap is of fixed size.

11. Apparatus according to claim 8, wherein the first and second working members are movable relative to one another so that the gap is variable in size between a maximum size, when the first and second members are in an open position, and a minimum size when the first and second working members are in a closed position.

12. Apparatus according to claim 11, wherein at least one array is located at or near, and for movement with, a leading edge of the first or the second working member.

13. Apparatus according to claim 8, wherein the axis of transmission for the emitters in the array thereof and the axis of reception for the receivers in the array thereof are off-set from one another so that, at least with the gap at or near its maximum value, no given axis of transmission is coaxial with a given axis of reception.

14. Apparatus according to claim 8, wherein at least the majority of axis of transmission are parallel to the majority of the axis of reception.

15. An elevator having a door gap scanned by the method of claim 1.

16. The elevator having a door gap and equipped with an apparatus according to claim 8, for scanning the gap.

* * * * *